United States Patent [19]
Shaffer

[11] Patent Number: 5,611,746
[45] Date of Patent: Mar. 18, 1997

[54] VEHICLE DRIVETRAIN COUPLING

[75] Inventor: Theodore E. Shaffer, Santa Barbara, Calif.

[73] Assignee: Asha Corporation, Santa Barbara, Calif.

[21] Appl. No.: 496,250

[22] Filed: Jun. 28, 1995

[51] Int. Cl.$^6$ .................................................. F16H 48/26
[52] U.S. Cl. ............................. 475/88; 475/89; 475/234
[58] Field of Search .................................... 475/84, 86, 88, 475/89, 234, 235

[56] References Cited

U.S. PATENT DOCUMENTS

| | | |
|---|---|---|
| 2,004,929 | 6/1935 | Centervall . |
| 2,026,777 | 1/1936 | Dumble . |
| 2,397,374 | 3/1946 | Schlicksupp ............................. 475/89 |
| 2,775,141 | 12/1956 | Ronning . |
| 2,922,319 | 1/1960 | Burner . |
| 3,229,550 | 1/1966 | Nickell . |
| 3,230,795 | 1/1966 | Mueller . |
| 3,251,244 | 5/1966 | Nickell . |
| 3,350,961 | 11/1967 | Dodge . |
| 3,361,008 | 1/1968 | Fallon . |
| 3,393,582 | 7/1968 | Mueller . |
| 3,407,599 | 10/1968 | Ulbricht . |
| 3,490,312 | 1/1970 | Seitz et al. . |
| 3,686,976 | 8/1972 | Philippi . |
| 3,724,289 | 4/1973 | Kennicutt . |
| 3,748,928 | 7/1973 | Shiber . |
| 3,752,280 | 8/1973 | Cheek . |
| 3,835,730 | 9/1974 | Pemberton . |
| 3,894,446 | 7/1975 | Snoy et al. . |
| 3,987,689 | 10/1976 | Engle . |
| 4,012,968 | 3/1977 | Kelbel . |
| 4,041,804 | 8/1977 | Clark . |
| 4,258,588 | 3/1981 | Yum . |
| 4,263,824 | 4/1981 | Mueller . |
| 4,272,993 | 6/1981 | Kopich . |
| 4,388,196 | 6/1983 | Lucia . |
| 4,445,400 | 5/1984 | Sullivan et al. . |
| 4,493,387 | 1/1985 | Lake et al. . |
| 4,548,096 | 10/1985 | Giocastro et al. . |
| 4,601,359 | 7/1986 | Weismann et al. . |
| 4,606,428 | 8/1986 | Giere . |
| 4,630,505 | 12/1986 | Williamson . |
| 4,644,822 | 2/1987 | Batchelor . |
| 4,650,028 | 3/1987 | Eastman et al. . |
| 4,679,463 | 7/1987 | Ozaki et al. . |
| 4,714,129 | 12/1987 | Mueller . |
| 4,719,998 | 1/1988 | Hiramatsu et al. . |
| 4,727,966 | 3/1988 | Hiramatsu et al. . |
| 4,730,514 | 3/1988 | Shikata et al. . |
| 4,732,052 | 3/1988 | Dewald . |
| 4,821,604 | 4/1989 | Asano . |
| 4,867,012 | 9/1989 | McGarraugh . |
| 4,876,921 | 10/1989 | Yasui et al. . |
| 4,884,470 | 12/1989 | Onoue . |
| 4,905,808 | 3/1990 | Tomita et al. . |
| 4,909,371 | 3/1990 | Okamoto et al. . |
| 4,919,006 | 4/1990 | Willett et al. . |
| 4,934,213 | 6/1990 | Niizawa ............................... 475/86 |
| 4,957,473 | 9/1990 | Takemura et al. . |

(List continued on next page.)

FOREIGN PATENT DOCUMENTS

| | | | |
|---|---|---|---|
| 256746 | 2/1988 | European Pat. Off. ................. | 475/86 |
| 1079479 | 3/1984 | U.S.S.R. . | |
| 2038429 | 11/1982 | United Kingdom . | |

*Primary Examiner*—Charles A. Marmor
*Assistant Examiner*—Nathan O. Jensen
*Attorney, Agent, or Firm*—Brooks & Kushman P.C.

[57] ABSTRACT

A hydraulic coupling (32,32a) includes a lock (204) for selectively preventing the level of torque transmitted from a coupling casing (34) to a pair of rotary members (26,28) from affecting torque transfer between the rotary members. The coupling (32) also includes an adjuster (216) for adjusting resistance of fluid flow from a hydraulic pump (48) through ports of the coupling to control coupling of the pair of rotary members (26,28) to each other. One embodiment of the coupling (32) operates in a supercharged pumping manner, while another embodiment of the coupling (32a) pumps the fluid through a clutch actuating piston (72) of the coupling.

20 Claims, 6 Drawing Sheets

U.S. PATENT DOCUMENTS

| | | |
|---|---|---|
| 4,960,011 | 10/1990 | Asano . |
| 4,966,268 | 10/1990 | Asano et al. . |
| 4,974,471 | 12/1990 | McGarraugh . |
| 5,005,131 | 4/1991 | Imaseki et al. . |
| 5,125,490 | 6/1992 | Suzumura ........................... 475/86 X |
| 5,189,930 | 3/1993 | Kameda . |
| 5,215,506 | 6/1993 | Hara ........................................ 475/86 |
| 5,299,986 | 4/1994 | Fabris et al. . |
| 5,310,388 | 5/1994 | Okcuoglu et al. . |

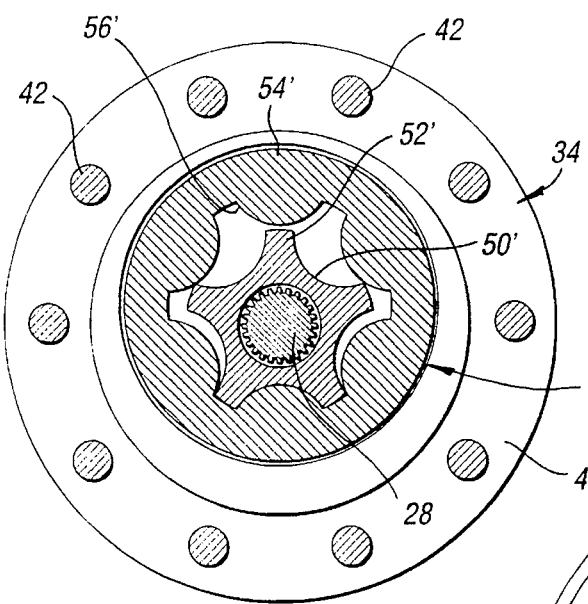
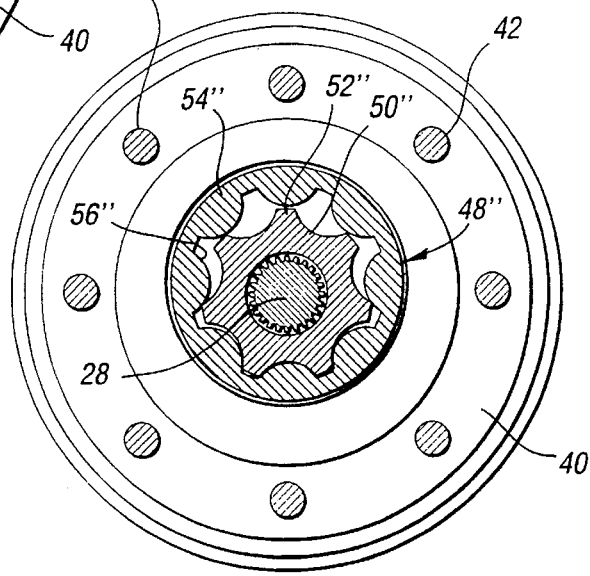
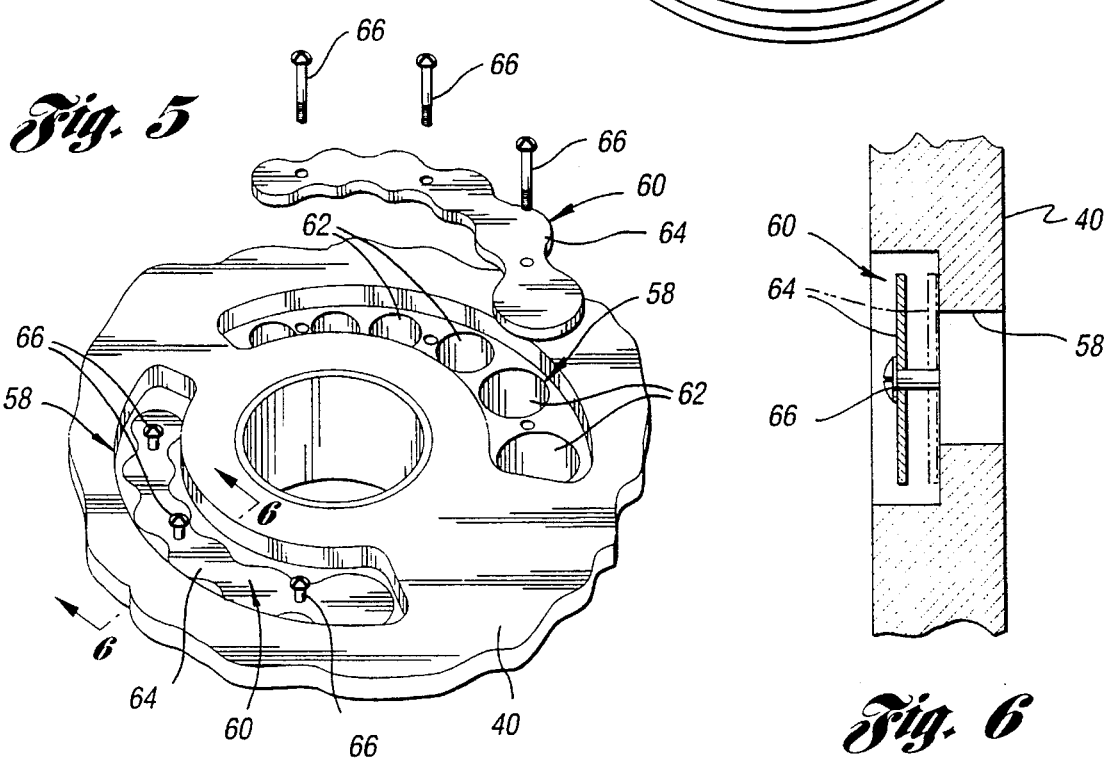

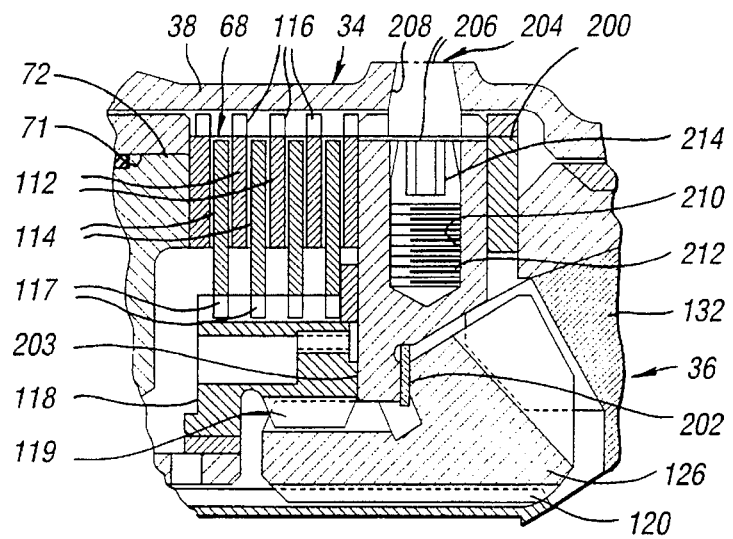
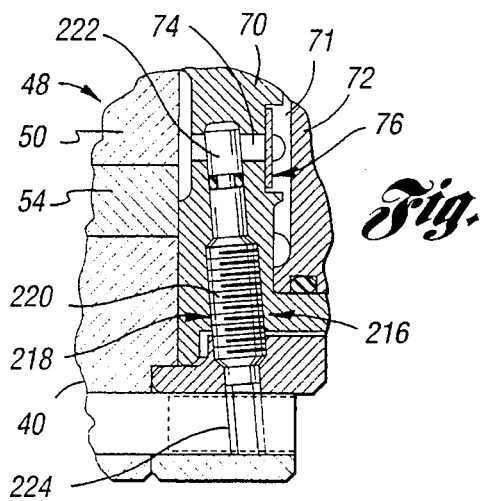
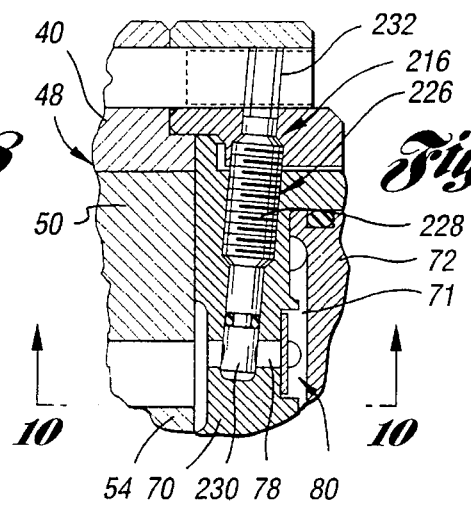
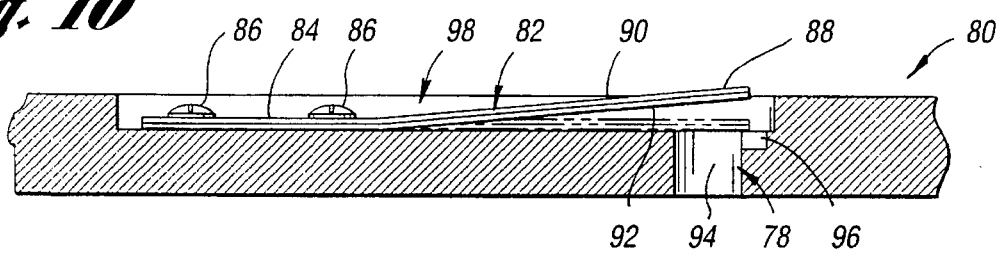
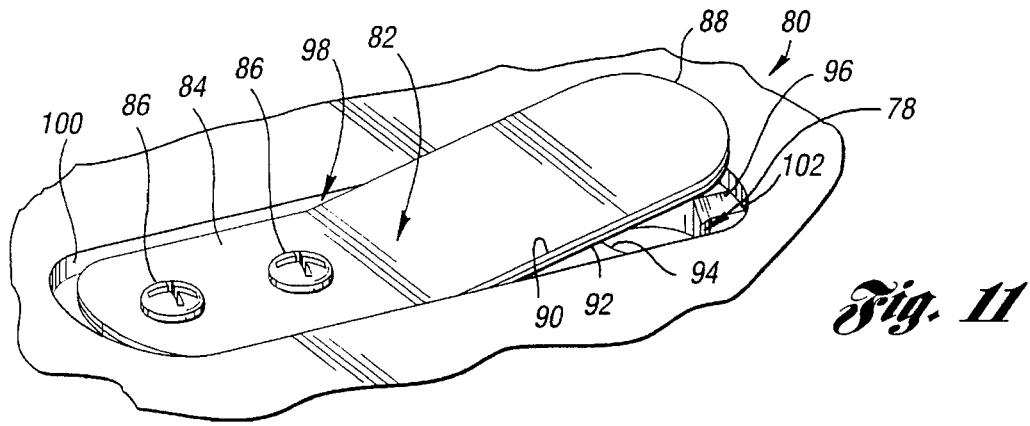

VEHICLE DRIVETRAIN COUPLING

TECHNICAL FIELD

This invention relates to a coupling for use with a vehicle drivetrain to rotatively couple a pair of rotary members about a rotational axis.

BACKGROUND ART

Hydraulic couplings have previously utilized hydraulic pumps to couple rotary members of a vehicle drivetrain. For example, U.S. Pat. No. 4,012,968 Kelbel discloses a differential mechanism wherein a hydraulic pump of the gerotor type is located radially outward from the axis of rotation of the two members and provides pumped hydraulic fluid to a clutch that controls operation of a bevel type planetary gear set to limit the differential action so as to thus have a limited slip function. U.S. Pat. No. 4,730,514 Shikata et al discloses another differential mechanism wherein a hydraulic pump controls operation of a bevel gear type planetary gear set that extends between two rotary members such that a limited slip function of the differential gear operation is also provided. United States Patent Okcuoglu et al discloses a vehicle drivetrain hydraulic coupling having a hydraulic clutch of the gerotor type. Furthermore, U.S. Pat. Nos. 3,748,928 Shiber; 4,719,998 Hiramatsu et al; 4,719,998 Hiramatsu et al; 4,727,966 Hiramatsu et al; and 4,909,371 Okamoto et al disclose hydraulic pumps utilized within vehicle drivetrains to control actuation of a clutch that connects two rotary members of a vehicle drivetrain.

DISCLOSURE OF INVENTION

An object of the present invention is to provide an improved coupling for use with a vehicle drivetrain to rotatively couple a pair of rotary members about a rotational axis.

In carrying out the above object, the vehicle drivetrain coupling of the invention according to one aspect has a bevel type planetary gear set and includes a lock for selectively preventing the extent of torque transferred from a coupling casing through the planetary gear set to a pair of rotary members from affecting actuation of a clutch that couples the rotary members.

In its preferred construction, the lock includes a thrust plate and a lock member that is selectively movable between an unlocked position where the planetary gear set can actuate the clutch according to the level of torque transmitted and a locked position where such actuation is prevented. The lock has particular utility when utilized with a coupling having a hydraulic pump that actuates the clutch and also functions as a brake in coupling the pair of rotary members to each other.

According to another aspect of the invention, the coupling includes a pump and has an adjuster for adjusting the resistance of fluid flow from a hydraulic pump that operates in response to differential rotation between the two rotary members. This adjuster in a supercharged embodiment of the coupling has adjustable valves for controlling the cross-sectional flow area at both a transfer port through which pumped hydraulic fluid is fed to a chamber and an outlet port that further controls pumped hydraulic fluid flow from the chamber back to the pump. In another embodiment, the adjuster has an adjustable valve at only the transfer port. The adjuster has particular utility when utilized with a coupling having a clutch that is actuated by the pumped hydraulic fluid to couple the two rotary members to each other and especially when the coupling also has a planetary gear set that cooperates in coupling the two rotary members to each other.

The objects, features and advantages of the present invention are readily apparent from the following detailed description of the best modes for carrying out the invention when taken in connection with the accompanying drawings.

BRIEF DESCRIPTION OF DRAWINGS

FIG. 3 is a view similar to FIG. 2 to illustrate that the pump can also have its impeller provided with five teeth and its internal ring gear provided with six teeth when a greater pumping capacity is desired;

FIG. 4 is a view similar to FIGS. 2 and 3 but illustrating the impeller as having seven teeth and the internal ring gear as having eight teeth when a more constant fluid pressure is desired;

FIG. 5 an exploded perspective view illustrating the construction of inlet valves for inlet ports through which hydraulic fluid is pumped into a casing of the coupling;

FIG. 6 is a sectional view taken along the direction of line 6—6 in FIG. 5 to illustrate the opening and closing valve operation;

FIG. 7 is a partial view of FIG. 1 but taken on an enlarged scale and illustrating a lock for selectively preventing the level of torque carried by the bevel type planetary gear set of the coupling from affecting actuation of the clutch of the coupling;

FIG. 8 is a partial view of FIG. 1 but taken on an enlarged scale and illustrating the construction of an adjuster valve for a transfer port of the coupling;

FIG. 9 is a partial view of FIG. 1 but taken on an enlarged scale and illustrating the construction of an adjuster valve for an outlet port of the coupling;

FIG. 10 is a partial sectional view taken along the direction of arrows 10—10 in FIG. 9 to illustrate the construction of the control valve at the outlet port with a valve element thereof shown in a solid line indicated open position and a phantom line indicated closed position with respect to the outlet port;

FIG. 11 is a perspective view that further illustrates the construction of the outlet port and the associated valve;

BEST MODES FOR CARRYING OUT THE INVENTION

Figure 1:
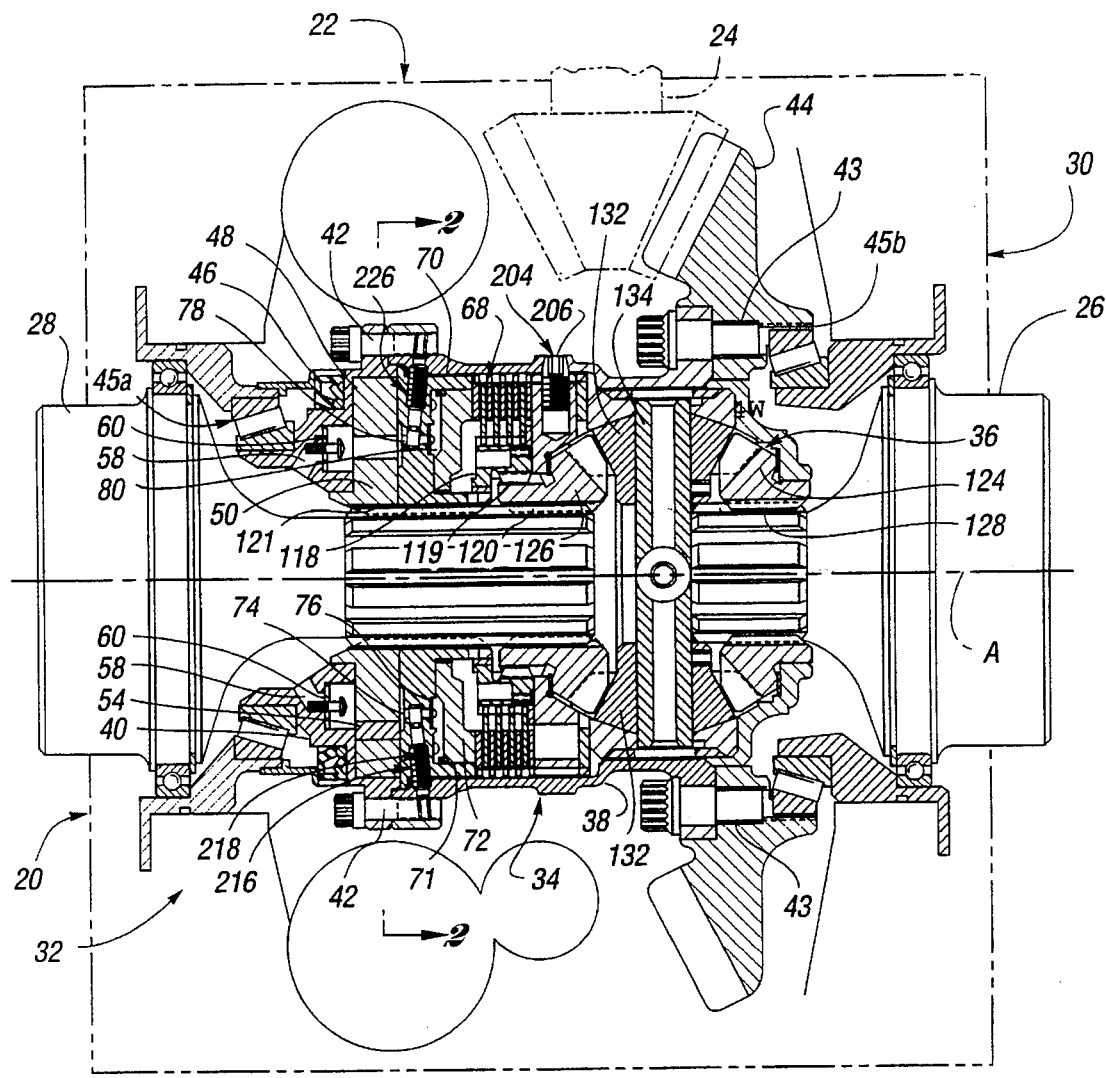
FIG. 1 is a sectional view taken through one embodiment of a coupling constructed in accordance with the present invention to couple a pair of rotary members and is illustrated as having a hydraulic pump that operates in a supercharged manner and has an associated clutch for limiting differential operation of a bevel type planetary gear set.

With reference to FIG. 1 of the drawings, a partially illustrated vehicle drivetrain that is generally indicated by 20 includes a differential 22 that is rotatively driven from the vehicle engine by a rotary drive member 24 and operates to drive a pair of axial half shafts 26 and 28 that respectively embody a pair of rotary members which rotate about a rotational axis A. The differential includes a housing 30 for containing hydraulic fluid and having suitable unshown seals through which the rotary members 24, 26 and 28 project. Within the housing 30, the differential includes a coupling 32 that embodies the present invention and operates to rotatively couple the axial half shafts 26 and 28 driven by the rotary drive member 24 as is hereinafter more fully described.

With continuing reference to FIG. 1, the hydraulic coupling 32 includes a casing 34 of a hollow construction that is rotatable within the housing about the rotational axis A and connected to the pair of rotary members 26 and 28 by a bevel type planetary gear set 36 as is hereinafter more fully described. Casing 34 as illustrated includes a somewhat cup-shaped member 38 and a cap member 40 which each have peripheral flanges secured to each other by circumferentially spaced bolts 42. Another set of circumferentially spaced bolts 43 secures a bevel type ring gear 44 to the cup-shaped casing member 38 for rotational driving of the casing 34 about axis A by the drive member 24. A pair of antifriction bearing assemblies 45a and 45b respectively mount the casing cap member 40 and the ring gear 44 secured to the casing cup-shaped member 38 to cooperatively support casing 34 for rotation within the differential housing about axis A. At the left casing end, a ring seal assembly 46 extends between the housing and the cap member 40 of the casing.

Figure 2:
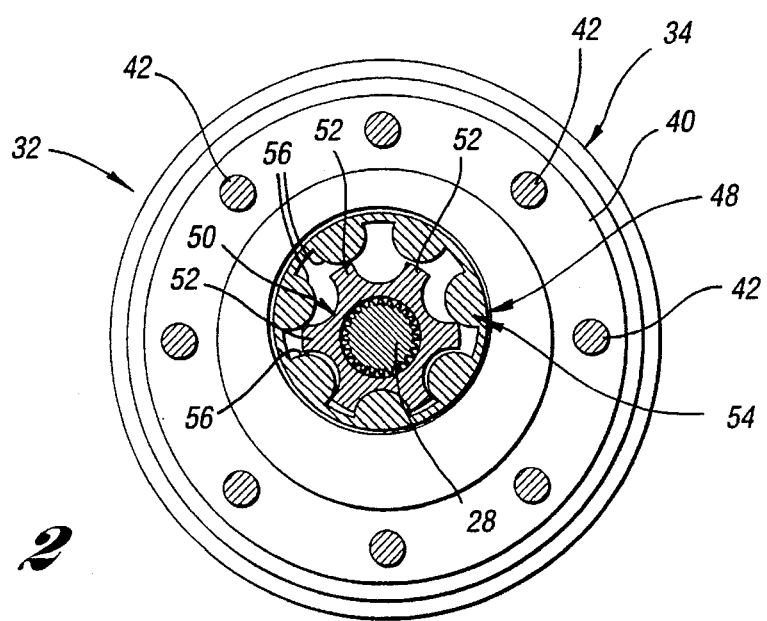
FIG. 2 is a sectional view taken through the coupling along the direction of line 2—2 in FIG. 1 and discloses the pump as having an impeller with six teeth meshed with an internal ring gear having seven teeth to provide a pumping action that allows the pump to function as a brake while still having relatively constant pumping pressure that facilitates actuation of the associated clutch without fluid pressure pulsation.

With combined reference to FIGS. 1 and 2, the coupling 32 also includes a hydraulic pump 48 located within the casing 34 along the rotational axis A and including a pumping component embodied by an impeller 50 having external teeth 52. The hydraulic pump also includes an internal ring gear 54 mounted by the casing 34 for rotation eccentrically with respect to the toothed impeller 50 and including internal teeth 56 of a number that is one more than the impeller teeth and which are in a meshing relationship with the impeller teeth to provide a pumping action upon relative rotation between the casing and the toothed impeller. As is hereinafter more fully described, the impeller 50 most preferably has six teeth 52 and the internal ring gear 54 has seven teeth 56 which is a relationship that provides sufficient pumping capacity so that the hydraulic pump can act effectively as a brake while still having relatively constant pumping pressure without fluid pulsation that would adversely affect the hydraulic coupling provided between the rotary members. As shown in FIG. 3, it is also possible for the hydraulic pump 48' to have its impeller 50' provided with five external teeth 52' and for the ring gear 54' to have six teeth 56' meshed with the impeller teeth which is a construction that will provide a somewhat greater pumping capacity but less consistency in the fluid pressure, but not so inconsistent as to interfere with effective hydraulic coupling between the rotary members. Likewise as illustrated in FIG. 4, it is also possible for the hydraulic pump 48" to have its impeller 50" provided with seven internal teeth 52" and its internal ring gear 54" to have eight teeth 56" when more consistent fluid pressure is desirable even though there is an accompanying decrease in the amount of pumped fluid. Thus, the impeller has between five and seven external teeth with six being most preferable while the internal ring gear has one more tooth than the number of impeller teeth utilized.

With combined reference to FIGS. 1, 5 and 6, the casing 34 has an inlet 58 through which hydraulic fluid is pumped into the casing by the hydraulic pump 48. There are actually two of the inlets 58 such that the pumping takes place in both directions of relative rotation between the pair of rotary members embodied by the axle half shafts 26 and 28. In this connection, each of the inlets 58 includes an associated check valve 60 for opening and closing inlet bores 62 (FIG. 5) of varying size along the direction of rotation. Each check valve 60 as shown in FIGS. 5 and 6 has a thin valve element 64 that is mounted by guides such as the threaded bolts 66 shown for movement between the solid line indicated open position of FIG. 6 and the phantom line indicated closed position. Upon one direction of relative rotation between the impeller 50 and the internal gear 54 shown in FIG. 2, one of the check valves 60 opens to permit the hydraulic fluid to be pumped from the housing 30 into the casing 34 while the other check valve 60 is then closed so that the hydraulic fluid is not pumped out of the casing through the other inlet port. During the opposite direction of relative rotation between the impeller 50 and the casing 34, the open and closed positions of the inlet ports 58 is reversed.

As illustrated in FIG. 1, a clutch 68 is received within the cup-shaped member 38 of casing 34. Adjacent the junction of the casing cup-shaped member 38 with the casing cap member 40, a pump housing insert 70 is mounted and receives the hydraulic pump 48 as well as interfacing with the clutch 68. This insert 70 has an annular piston chamber 71 that receives a clutch actuating piston 72 that engages the clutch 68 as is hereinafter more fully described to couple the casing 34 with the left axle half shaft 28 and also with the right axle half shaft 26 as is also hereinafter more fully described. Insert 70 also has a wall defining a pair of transfer ports 74 (FIG. 21) through which hydraulic fluid is pumped from the hydraulic pump 48 to the piston chamber to act on the clutch actuating piston. This flow through the transfer ports 74 is through one of the transfer ports upon one direction of relative rotation between the impeller 52 and the ring gear 54 and is through the other transfer port during the other direction of relative rotation between the impeller and the ring gear. Each of the transfer ports 74 has an associated check valve 76 of a construction that is hereinafter more fully described in connection with FIGS. 13 through 15. These check valves 76 ensure that the hydraulic fluid pumped through either transfer port to the clutch actuating piston is not pumped back into the hydraulic pump 48 through the other transfer port.

Figure 21:
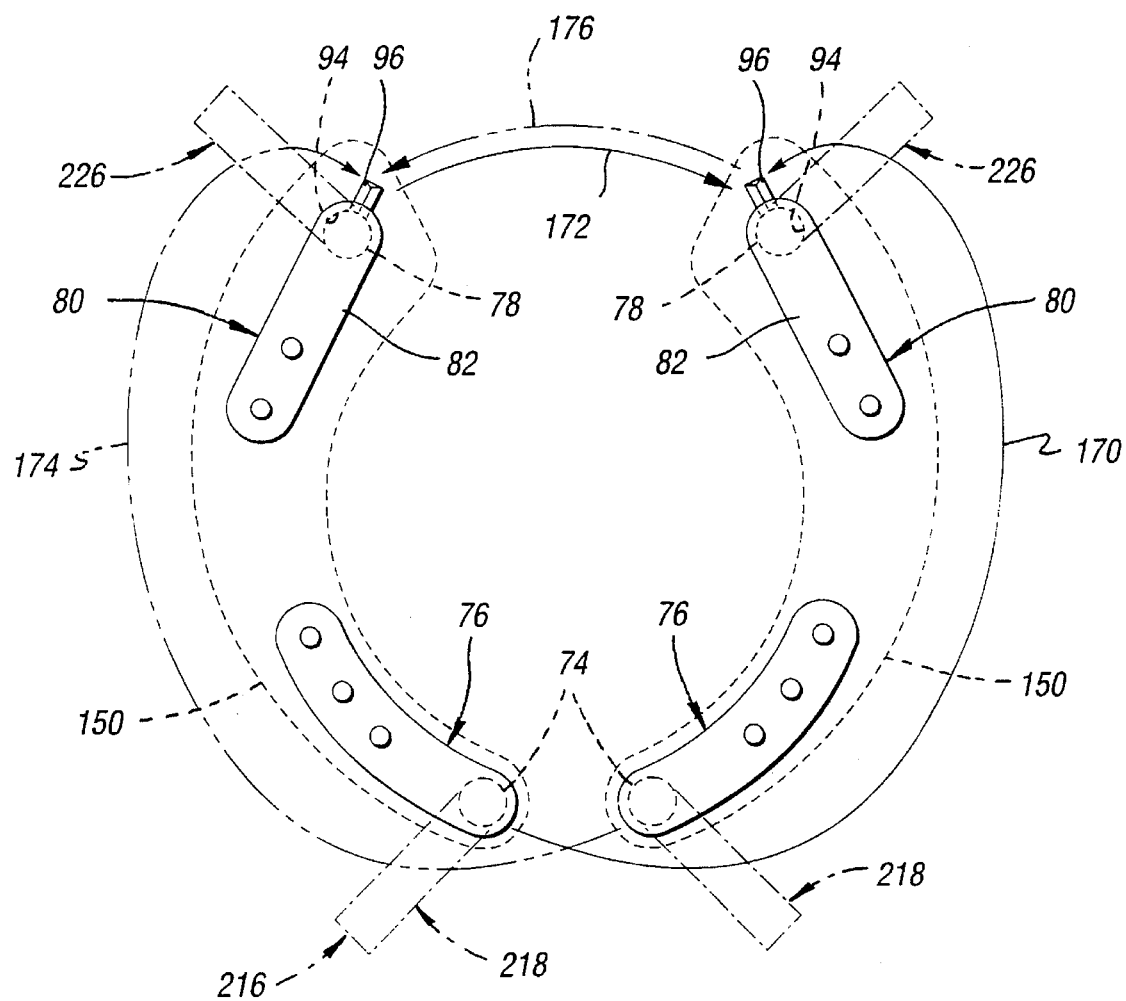
FIG. 21 is a schematic view that illustrates the fluid flow of the supercharged circuit of the coupling embodiment of FIG. 1.

As best illustrated in FIGS. 10 and 11, an outlet port 78 is also provided and in the embodiment of FIG. 1 is located on the pump housing insert 70 such that the pumped fluid flows from the piston chamber 71 back to the low pressure side of the pump in a supercharged manner. There are actually two of such outlet ports 78 as shown in FIG. 21, with one outlet port functioning in one direction of relative rotation between the axle half shafts and the other functioning in the other direction of relative rotation. A control valve 80 associated with each outlet port 78 closes the outlet port as is hereinafter more fully described when the pumped fluid reaches a predetermined pressure which is proportional to the rate of rotation between the pump impeller and ring gear and thus corresponds to the relative rotation between the right axle half shaft 26 connected through the differential 36 to the casing 34 and the left axle half shaft 28 that is connected to the impeller 50. As the pumped hydraulic fluid reaches the predetermined pressure, the valve 80 closes as is hereinafter more fully described to close the outlet port 78 and thus prevent the hydraulic fluid from being pumped from the hydraulic pump 48. This causes the hydraulic pump 48 to act as a brake by coupling the impeller 52 with the internal ring gear 54 and thereby also couples the rotary members embodied by the right and left axle half shafts 26 and 28 to each other.

As is hereinafter described in connection with FIG. 21, there are actually two of each of the transfer ports 74 as well as two of the outlet ports 78 in the illustrated FIG. 1 embodiment which functions in a supercharged manner. However, as a result of an is adjustment feature of the outlet ports 78 as hereinafter described, it is possible for tuning to permit one of the outlet ports 78 to function as the transfer port in one direction of relative rotation between the axle half shafts 26 and 28 and for the other outlet port 78 to function as the transfer port in the other direction of relative rotation between the axle half shafts.

As best illustrated in FIGS. 10 and 11, the control valve 80 includes an elongated metallic strip valve element 82 having one end 84 that is mounted in a spaced relationship to the outlet port 78 in any suitable manner such as by the headed bolts 86 illustrated. Valve element 82 also has another distal end 88 that is movable between a solid line indicated open position spaced from the outlet port 78 as shown in FIG. 10 and a phantom line indicated closed position that closes the outlet port. This valve element 82 is of the bimetallic type and thus includes two metals 90 and 92 that have different coefficients of thermal expansion so as to cause the valve element to move as its temperature is raised and lowered. More specifically, as the hydraulic fluid is heated such as during continued usage, the valve element end 88 moves toward the outlet port 78 with the net result being that the less viscous fluid will close the valve 80 at the same pressure of pumped fluid corresponding to the same amount of relative rotation between the axle half shafts. Furthermore, upon cooling of the hydraulic fluid such as after rest for a certain period of time, the valve element end 88 moves away from the outlet port 78 such that the valve closes at the same pressure of pumping of the more viscous hydraulic fluid. Thus, the bimetallic valve element 82 compensates for viscosity changes as the hydraulic fluid is heated and cooled to ensure that the coupling between the two rotary members embodied by the two axle half shafts takes place at the same rate of relative rotation. More specifically, the valve closing as discussed above causes the hydraulic pump 48 to then function as a brake that limits the relative rotation between the two rotary members embodied by the two axle half shafts and also causes the actuation of the clutch 68 to further couple the two axle half shafts to each other.

As best illustrated in FIGS. 10 and 11, the outlet port 78 preferably includes a main passage 94 that is closed by the valve element 82 as its end 88 moves from the open position to the closed position as previously described. Outlet port 78 also includes a bleed passage 96 that remains open even when the valve element 82 is closed with respect to the main passage 94. This bleed passage 94 dampens the closing action of the control valve element 82 and also allows fluid flow that, upon termination of the torque loading between the two rotary members, releases the fluid pressure in the piston chamber to permit opening of the control valve 80. When the valve element 82 opens, the fluid flow through both passages of the outlet port 78 provides cleaning of the bleed passage 96 to remove any small particles that might block the smaller cross-sectional flow area of the bleed passage. The control valve 80 is thus self cleaning during normal usage. Also, as the bleed passage 96 allows valve opening and pressurized fluid to flow from the piston chamber 71 when the hydraulic pumping stops as the pair of rotary members are unloaded, the clutch 68 is disengaged as the pressure in the piston chamber drops as is hereinafter more fully described.

As shown in FIGS. 10 and 11, the coupling includes an elongated mounting recess 98 having one end 100 at which the one end 84 of the valve element 82 is mounted and having another end 102 at which the main passage 94 and bleed passage 96 of the outlet port 78 are located. This recess in cooperation with the bimetallic valve element 82 provides a continually varying change in the cross-sectional flow area of flow to the outlet port 78 from the other side of the valve element such that movement of the valve element end 88 in response to temperature changes provides an accurate control of the pressure at which the valve element closes to initiate the operation of the hydraulic pump as a brake and the actuation of the clutch. For any given predetermined open position of the valve element 82, there is a certain pressure at which the hydraulic fluid of a certain velocity will cause closure of the valve element. This results from the flow of the hydraulic fluid between the valve element end 88 and the adjacent end of the recess 102 to the outlet port 78. This flow causes a pressure drop in the fluid upon passage past the valve element end 88 so that there is less force acting on the outlet side of the valve element end 88 than on the hydraulic pump side which are respectively the lower and upper sides as illustrated in FIG. 10. Movement of the valve element 82 to change the position of its end 88 in response to temperature changes varies the cross-sectional area of flow between this valve element end and the recess end 102 so as to thereby accurately compensate for temperature changes and ensure that the closure of the valve 80 corresponds to the same rate of relative rotation between the rotary members embodied by the axle half shafts 26 and 28 shown in FIG. 1.

With reference to FIG. 1, the coupling 32 whose one rotary member embodied by the right axle half shaft 26 is connected with the casing 34 also has the clutch 68 previously described that extends between the other rotary member embodied by the other axle half shaft 28 and the casing. This clutch 68 as shown in FIG. 7 includes alternating sets of clutch plates 112 and 114 with the one set of clutch plates 112 having outer peripheries with spline connections 116 to the casing 34, and with the other set of clutch plates 114 having a central opening with spline connections 117 to a hub 118 that has spline connections 119 to the planetary gear set 36 as is hereinafter more fully described. The left axle half shaft 28 has a spline connection 120 to the planetary gear set 36 as shown in FIG. 7 and a spline connection 121 to the pump impeller 50 as shown in FIG. 1 on the opposite side of the insert 70 from the clutch 68. Pumped hydraulic fluid acting on the clutch piston 72 compresses the sets of clutch plates 112 and 114 to provide the coupling between the pair of rotary members embodied by the axle half shafts 26 and 28.

As previously mentioned, the hydraulic coupling 32 illustrated in FIG. 1 has the planetary gear set 36 which is of the bevel gear type connecting the casing 34 and the one rotary member embodied by the right axle half shaft 26. This planetary gear set 36 includes a pair of bevel side gears 124 and 126 which have respective spline connections 128 and 120 to the rotary members embodied by the axle half shafts 26 and 28. Bevel planet gears 132 of the gear set 36 are each meshed with the pair of bevel side gears 124 and 126 and are rotatably supported by a cross pin 134 that extends through the rotational axis A between opposite sides of the casing 34. The clutch 68 is connected as shown in FIG. 7 through the hub 118 to the one bevel gear 126 of the planetary gear set 36 and hence with the axle half shaft 28. Planetary gear set 36 provides a differential action between the rotary members embodied by the axle half shafts 26 and 28 until closure of the control valve 80 causes the hydraulic pump 48 to function as a brake and also actuate the clutch 68 as previously described whereupon the axle half shaft 26 is coupled through the spline connections 128, bevel side gear 124, planet gears 132, bevel side gear 126 and the spline connection 120 with the other axle half shaft 28.

Figure 12:
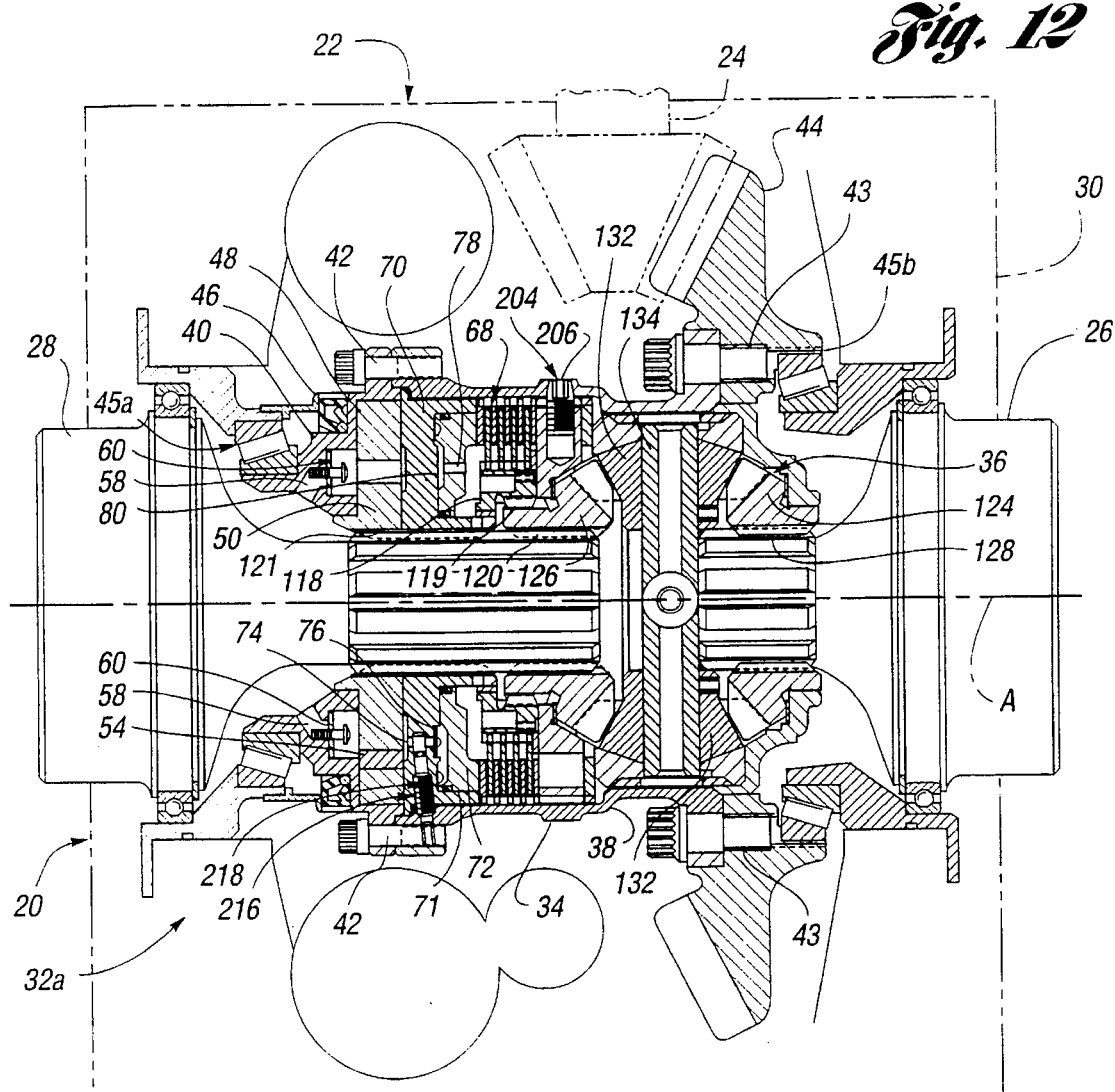
FIG. 12 is a sectional view of another embodiment of the coupling that is similar to the embodiment of FIG. 1 but, instead of having a pump that operates in a supercharged manner, has its outlet port extending through a clutch actuating piston of the coupling.

With reference to FIG. 12, another embodiment of the coupling is indicated by reference numeral 32a. This embodiment of the hydraulic coupling 32a has the same construction as the embodiment disclosed in FIGS. 1–11 except as will be noted and thus has like reference numerals applied to like components thereof such that much of the previous description is applicable and thus need not be repeated. However, in this embodiment, the outlet port 78 extends through the piston 72 within the piston chamber 71. Furthermore, the control valve 80 which has the same construction as previously described is mounted on the piston 72 that actuates the clutch. Fluid that flows through the control valve 80 prior to its closing and the bleed fluid that flows therethrough lubricates the clutch 68 in this embodiment. Thus, this embodiment unlike the previously described embodiment of the coupling does not operate in a supercharged manner with the pumped fluid from the piston chamber 71 being fed back to the low pressure side of the pump. However, this embodiment of the coupling 32a does have a pair of the transfer ports 74 so as to operate in both directions of relative rotation between the rotary members embodied by the axle half shafts, but only one outlet portion is needed for effective operation.

Figures 13, 14:
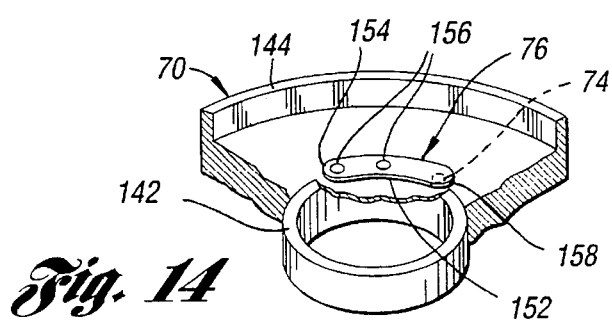
FIG. 13 is an enlarged sectional view illustrating the transfer port and associated check valve through which the hydraulic fluid is pumped to the clutch actuating piston of each embodiment of the coupling.
FIG. 14 is a partial perspective view that further illustrates the transfer port check valve in its closed position.
Figure 15:
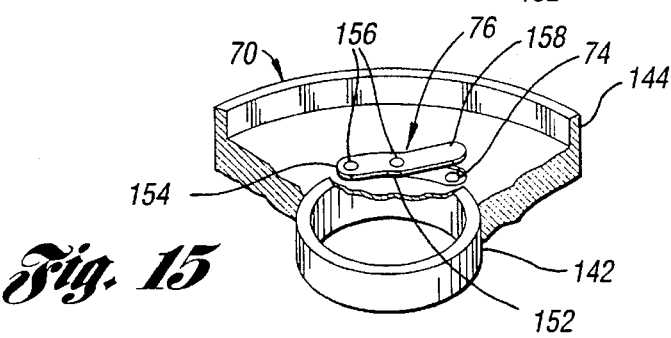
FIG. 15 is a partial perspective view similar to FIG. 14 but with the transfer port check valve shown in its open position.

With reference to FIGS. 12 through 14, each transfer port 74 extends through the insert 70 from the pump side toward the piston side and has the associated check valve 76 mounted on the piston side where the piston is sealed between inner and outer annular flanges 142 and 144 by respective O-rings 146 and 148. On the pump side, the transfer port 74 has an enlarged shallow collection portion 150 that allows the pumped hydraulic fluid to be received from different radial locations for eventual flow through the transfer port and the check valve 76 in the piston side in order to provide the piston actuation as previously described. As best illustrated in FIGS. 14 and 15, each check valve 76 includes a metallic strip valve element 152 having one end 154 mounted on the metallic insert by suitable fasteners 156 such as the headed bolts shown and has another distal end 158 that is normally biased to the closed position of FIG. 14 by a resilient spring force of the valve element. However, the pressurized fluid upon pumping acts against the spring bias to provide opening of the valve distal end 158 as shown in FIG. 15 to permit the fluid flow that moves the piston and actuates the clutch as previously described.

An adjustment capability of the cross-sectional flow area through each transfer port 74 and outlet port 78 of the FIG. 1 embodiment, and of each transfer port 74 of the FIG. 12 embodiment, as is hereinafter more fully described, allows these ports to be tuned from a normal relationship where the flow areas are approximately equal to each other. Tuning of the coupling can also be performed so the cross-sectional flow area of the transfer port 74 is smaller than the cross-sectional flow area of the outlet port 78 such that the closing of the open control valve 80 is delayed as is the consequent actuation of the clutch 68. Furthermore, faster control valve closing and consequent clutch actuation can be achieved by adjusting the cross-sectional flow area of the transfer port 74 to be larger than the cross-sectional flow area of the open control valve 80. In addition, it may also be possible to tune the operation by controlling the closing spring bias of the transfer port valve element 152.

Figure 16:
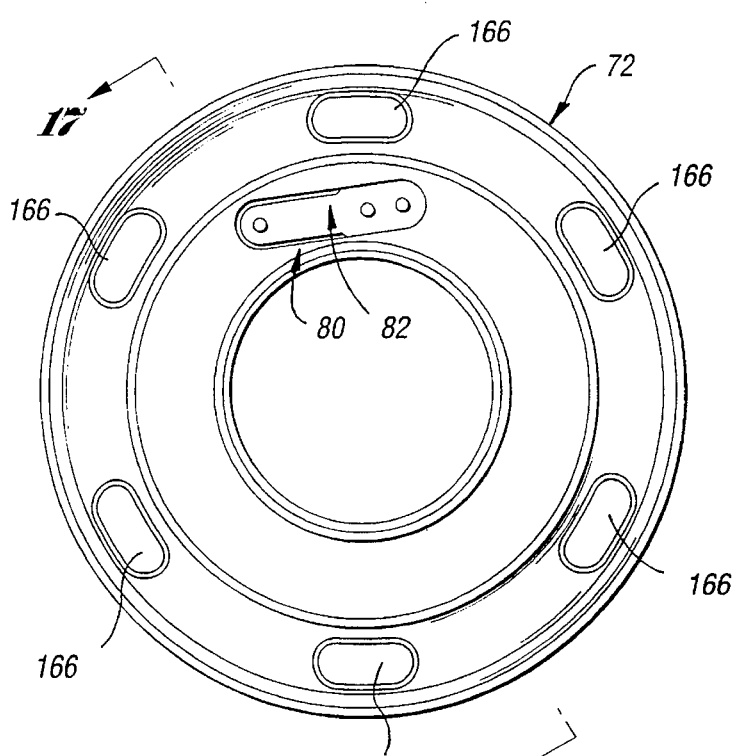
FIG. 16 is an axial view of one construction of an actuating piston of the clutch.
Figure 17:
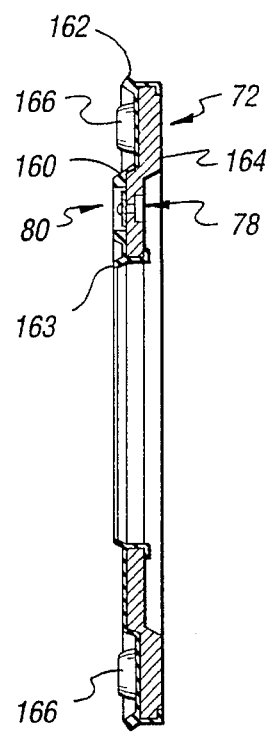
FIG. 17 is a sectional view of the actuating piston taken along the direction of line 17—17 in FIG. 16.

With reference to FIGS. 16 and 17, another embodiment of the piston 72 of the FIG. 12 embodiment of the coupling is illustrated as having the control valve 80 mounted thereon as previously described and also is shown as having a coating 160 of an elastomeric rubber-like material, such as for example an ethylene acrylic resin, on its one side which faces the hydraulic pump in the assembled condition. This coating 160 also defines outer and inner annular seals 162 and 163 for sealing with the adjacent outer and inner annular walls of the coupling to provide a slidably sealed relationship. This coating 160 is injection molded on a stamped steel plate 164 of the piston 72 and also has positioning lugs 166 spaced circumferentially about its periphery so as to protect the seal 162 when the piston moves to its full extent toward the left within the casing of the coupling.

Figure 18:
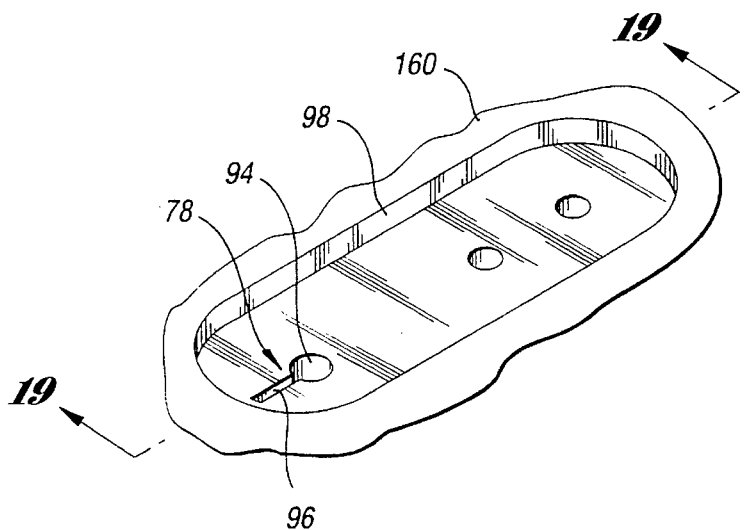
FIG. 18 is a perspective view illustrating the piston mounted control valve outlet port which includes a main passage and a bleed passage and which is located within a recess.
Figure 19:
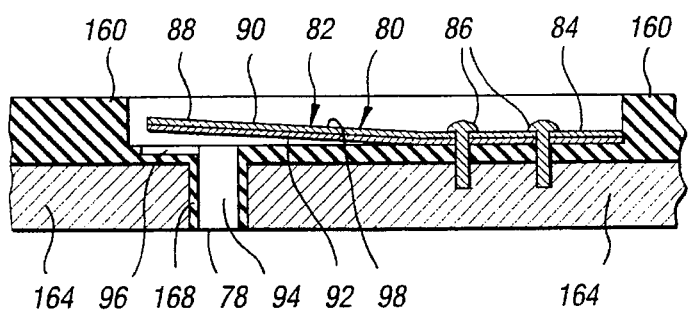
FIG. 19 is a sectional view taken through the control valve generally in the direction of line 19—19 in FIG. 18 and also illustrates the valve element that controls fluid flow through the port illustrated.

With additional reference to FIGS. 18 and 19, the piston coating 160 is injection molded to define the outlet port 78 with its main passage 94 and bleed passage 96 previously described as well as to define the mounting recess 98 in which the valve element 82 of the control valve 80 is mounted as specifically shown in FIG. 19. Injection molding of the coating facilitates the provision of the outlet port 78 with its main passage 94 and bleed passage 96. Furthermore, it should be noted the coating 160 may have an annular portion 168 that extends through a hole in the piston plate 164 to readily define the required cross-sectional flow area of the main passage 94 of the outlet port 78 to thereby also facilitate tuning of the coupling as described above.

Figure 20:
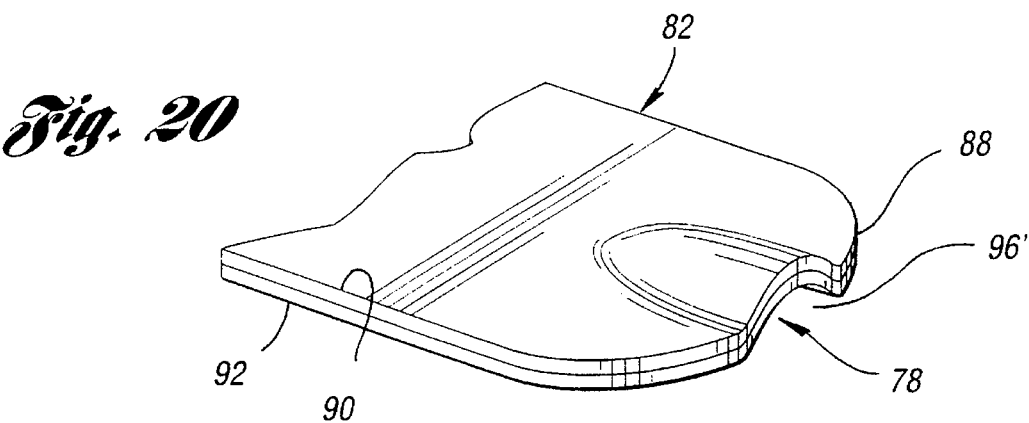
FIG. 20 is a partial perspective view of another construction of the control valve element for defining the bleed passage.

With reference to FIG. 20, it is also possible for the bleed passage 96' of the outlet port to be provided by forming the distal end of the control valve element 82 as illustrated. Upon opening of the control valve element 82, cleaning flow of the bleed passage takes place in the same manner previously described where the bleed passage is located on either the pump insert 70 or the piston 72.

As previously described in connection with the FIG. 1 embodiment of the coupling and as illustrated in FIG. 21, two sets of transfer and outlet ports 74 and 78 with associated check valves 76 and control valves 80 are provided with each set located within an associate collection portion 150 on the pump side of the insert wall through which the ports extend. During one direction of relative rotation between the rotary members 26 and 28 (FIG. 2), the pumped hydraulic fluid flows from the hydraulic pump through the left transfer and outlet ports 74 and 78 shown in FIG. 21 to the piston chamber for flow to the right outlet port 78 back to the low pressure side of the pump as illustrated by the two solid line indicated arrows 170 and 172. During the other direction of relative rotation between the pair of rotary members, the hydraulic fluid flows from the pump through the right transfer and outlet ports 74 and 78 into the piston chamber for flow to the left outlet port 78 as shown by the phantom line indicated arrows 174 and 176. As such, there is a continual pumping during relative rotation between the pair of rotary members from the hydraulic pump to the piston chamber 71 to provide actuation of the clutch 68 while the hydraulic fluid is then pumped back to the low pressure side of the hydraulic pump for further pressurization.

The coupling embodiments 32 and 32a respectively illustrated by FIGS. 1 and 12 each has a thrust plate 200 as illustrated in FIG. 7 located between the planetary gear set 36 and the clutch 68. This thrust plate 200 has an annular construction extending about the left bevel side gear 126 and is axially engaged therewith at an annular thrust interface 202. The clutch hub 118 is also axially engaged by the thrust plate 200 at an interface 203 and is slidable with respect to the clutch at the spline connection 117 and with respect to the left bevel side gear 126 at the spline connection 119 along the direction of rotation. Due to the bevel construction of the planetary gear set 36, an increased torque load transmitted from the coupling casing 34 through the planetary gear set to the rotary members embodied by the axle half shafts 26 and 28 forces the side gears 124 and 126 (FIGS. 1 and 12) away from each other. This spreading action of the planetary gear set forces the thrust plate 200 illustrated in FIG. 7 toward the left which is permitted by the axial movement of the clutch hub 118. As such the thrust plate 200 acts against the clutch plates 112 and 114, which are thus engaged with each other to couple the casing 34 and the left bevel side gear 126 in order to provide a locking action of the differential and consequent torque transmission between the axle half shafts.

With continuing reference to FIG. 7, each embodiment of the coupling has a lock 204 for selectively preventing the planetary gear set 36 from forcing its side gears away from each other to actuate the clutch 68. Upon such locking, the extent of torque transfer from the rotating casing 34 to the pair of rotary members embodied by the axle half shafts does not affect the torque transfer between the pair of rotary members. This lock 204 utilizes the thrust plate 200 through which the planetary gear set 36 operates as previously described to apply force to actuate the clutch 68 and also includes at least one lock member 206 movable between the solid line indicated unlocked position in FIG. 7 and the phantom line indicated locked position. In the solid indicated unlocked position, the thrust plate 200 is movable to actuate the clutch 68 as described above. In the phantom line indicated locked position, the lock member 206 extends between the thrust plate 200 and the casing 34 to prevent movement of the thrust plate and actuation of clutch 68.

In the preferred construction, the lock 204 includes a plurality of the lock members 206 spaced circumferentially around the thrust plate 200. Furthermore, the casing 34 has a tapered opening 208 associated with each lock member 206 and the thrust plate 200 has a threaded hole 210 associated therewith. Each lock member 206 has a threaded shank 212 received by the associated threaded hole 210 of the thrust plate 202. Each lock member 206 also has a tapered head 214 with a suitable wrench socket opening that allows rotation of the lock member within its thrust plate threaded hole 210. Such rotation moves the lock member 206 as shown in FIG. 7 between the solid line indicated unlocked position and the phantom line indicated locked position where the tapered head 214 of the lock member is received by the tapered opening 208 of casing 34. This tapered construction facilitates the initial alignment and movement of the lock member head 214 into the casing opening 208 as well as providing a loaded connection therebetween to securely fix the thrust plate 200 against movement.

In the preferred construction of each embodiment of the coupling 32 and 32a respectively illustrated in FIGS. 1 and 12, the pump 48 as previously described biases the piston 72 within the piston chamber 71 to actuate the clutch 68 in response to the differential rotation between the axle half shafts 26 and 28. While the lock 204 can be utilized without any such hydraulic pump actuation of the clutch to result in an open differential with the lock in its locked position, the construction illustrated has particular utility in the manner in which the clutch 68 is also actuated in response to the rate of differential rotation between the axle half shafts regardless of whether the lock is in its locked or unlocked position.

Each of the embodiments of the coupling 32 and 32a respectively illustrated in FIGS. 1 and 12 has an adjuster 216 for adjusting the resistance of fluid flow to control the coupling of the pair of rotary members embodied by the axle half shafts 26 and 28 to each other. More specifically as also illustrated in FIG. 8, the adjuster 216 includes an adjustable valve 218 for adjusting the flow area of the transfer port 74 from the hydraulic pump 48 to the piston chamber 71 through the associated check valve 76. This adjustable valve 218 includes a valve element 220 having a threaded portion that is received by a threaded hole in the insert 70 and having an end 222 that projects into the transfer port 74. A head 224 of the valve element 220 is engageable by a suitable tool to rotate the valve element for adjusting the flow area of the transfer port 74.

The embodiment of the coupling 32 illustrated in FIG. 1 also has its adjuster 216 provided with another adjustable valve 226 as illustrated in FIG. 9 for adjusting the flow area of the outlet port 78 from the piston chamber 71 through the control valve 80 and the outlet port 78 back to the hydraulic pump 48 as previously described. This adjustable valve 226 includes a valve element 228 having a threaded portion that is threaded into a threaded hole in the insert 70 and has an end 230 that projects into the outlet port 78. In addition, the valve element 228 has a head 232 that is engaged by a suitable tool to rotate the valve element and thereby position its end 230 for adjusting the cross-sectional flow area of the outlet port 78.

Thus, in the FIG. 1 embodiment of the coupling 32, both the transfer ports 74 and the outlet ports 78 can be adjusted to tune the coupling for desired operation. As previously mentioned, such tuning can effectively eliminate the operation of the transfer ports as previously described since each outlet port 78 in the supercharged manner can function as either the transfer port or the outlet port depending upon the direction of relative rotation between the pair of rotary members being coupled.

With the FIG. 12 embodiment of the coupling 32a, only the transfer port 74 is adjusted by the associated valve 218 to provide the tuning of the coupling operation.

While the best modes for carrying out the invention have been described in detail, those familiar with the art to which this invention relates will recognize various alternatives, designs and embodiments for practicing the present invention as defined by the following claims.

What is claimed is:

1. A coupling for use with a vehicle drivetrain to rotatively couple a pair of rotary members about a rotational axis, the coupling comprising: a casing of hollow construction that is rotatively driven about the rotational axis; a bevel type planetary gear set located within the casing and having a pair of bevel side gears respectively connected to the pair of rotary members as well as having a carrier that is rotatable with the casing and has bevel planet gears meshed with the side gears connected to both rotary members; a clutch that is actuatable to connect the casing and one of the rotary members; the planetary gear set upon transfer of torque from the rotating casing through the planetary gear set to the pair of rotary members forcing the side gears thereof away from each other to actuate the clutch and connect the pair of rotary members for torque transfer therebetween at a level that increases with increased torque transfer from the rotating casing to the rotary members; and a lock for selectively preventing the planetary gear set from forcing the side gears thereof away from each other to actuate the clutch such that the extent of the torque transfer from the rotating casing to the pair of rotary members does not affect torque transfer between the pair of rotary members.

2. A coupling as in claim 1 which includes a thrust plate through which the planetary gear set applies force to actuate the clutch, and the lock including at least one lock member movable between an unlocked position where the thrust plate is movable to actuate the clutch and a locked position where the lock member extends between the thrust plate and the casing to prevent movement of the thrust plate and actuation of the clutch.

3. A coupling as in claim 2 wherein the casing has a tapered opening, the thrust plate having a threaded hole, the lock member having a threaded shank received by the threaded hole of the thrust plate, and the lock member having a tapered head that is free of the casing in the unlocked position and that is received by the tapered opening of the casing in the locked position.

4. A coupling as in claim 1, 2 or 3 further including a pump for pumping hydraulic fluid upon differential rotation between the pair of rotary members, the casing having an inlet port through which hydraulic fluid is pumped into the casing through the inlet port, the clutch including a piston chamber located within the casing and having an actuating piston that is received within the piston chamber and operable to actuate the clutch and couple the two rotary members to each other, the casing including a transfer port through which the pumped hydraulic fluid is fed from the hydraulic pump to the piston chamber, the casing also including an outlet port through which pumped hydraulic fluid flows from the piston chamber, and a control valve including a valve element movable between an open position spaced from the outlet port and a closed position that closes the outlet port when the pumped fluid reaches a predetermined pressure to actuate the piston and engage the clutch to thereby rotatively couple the pair of rotary members to each other upon differential rotation of the rotary members.

5. A coupling as in claim 4 wherein the casing includes a wall that separates the pump and the piston chamber, the transfer port extending through the casing wall to permit flow of hydraulic fluid from the pump to the piston chamber, and the outlet port extending through the casing wall to permit flow of the pumped hydraulic fluid from the piston chamber back to the pump in a supercharged manner under the control of the control valve.

6. A coupling as in claim 5 wherein the pump includes an impeller rotatively connected to one of the rotary members and having between five and seven external teeth, the hydraulic pump also including an internal ring gear mounted by the casing for rotation eccentrically with respect to the impeller and including internal teeth of a number one more than the impeller teeth and in a meshing relationship therewith to provide the pumping action upon relative rotation between the casing and the toothed impeller.

7. A coupling as in claim 4 wherein the outlet port extends through the piston, and the control valve being mounted on the piston to control flow of hydraulic fluid from the piston chamber through the outlet port in the piston.

8. A coupling as in claim 7 wherein the pump includes an impeller rotatively connected to one of the rotary members and having between five and seven external teeth, the hydraulic pump also including an internal ring gear mounted by the casing for rotation eccentrically with respect to the toothed impeller and including internal teeth of a number one more than the impeller teeth and in a meshing relationship therewith to provide the pumping action upon relative rotation between the casing and the toothed impeller.

9. A coupling for use with a vehicle drivetrain to rotatively couple a pair of rotary members about a rotational axis, the coupling comprising: a casing of hollow construction that is rotatively driven about the rotational axis; a bevel type planetary gear set located within the casing and having a pair of bevel side gears respectively connected to the pair of rotary members as well as having a carrier that is rotatable with the casing and has bevel planet gears meshed with the side gears connected to both rotary members; a clutch that is actuatable to connect the casing and one of the rotary members; the planetary gear set upon transfer of torque from the rotating casing through the planetary gear set to the pair of rotary members forcing the side gears thereof away from each other to actuate the clutch and connect the pair of rotary members for torque transfer therebetween at a level that increases with increased torque transfer from the rotating casing to the rotary members; a pump for pumping hydraulic fluid upon differential rotation between the pair of rotary members; the casing having an inlet port through which hydraulic fluid is pumped into the casing; the clutch including a piston chamber located within the casing and having an actuating piston that is received within the piston chamber and operable to actuate the clutch and couple the two rotary members to each other; the casing including a transfer port through which the pumped hydraulic fluid is fed from the hydraulic pump to the piston chamber; the casing also including an outlet port through which pumped hydraulic fluid flows from the piston chamber; a control valve including a valve element movable between an open position spaced from the outlet port and a closed position that closes the outlet port when the pumped fluid reaches a predetermined pressure to actuate the piston and engage the clutch to thereby rotatively couple the pair of rotary members to each other upon differential rotation of the rotary members; a lock including a thrust plate that actuates the clutch when the side gears are forced away from each other by the torque transferred from the casing to the pair of rotary members;

and the lock including at least one lock member movable between an unlocked position where the thrust plate is movable to actuate the clutch and a locked position where the lock member extends between the thrust plate and the casing to prevent movement of the thrust plate and actuation of the clutch such that the extent of the torque transfer from the rotating casing to the pair of rotary members does not affect torque transfer between the pair of rotary members and only the pumped hydraulic fluid acting on the piston actuates the clutch.

10. A coupling for use with a vehicle drivetrain within a housing thereof containing hydraulic fluid to rotatively couple a pair of rotary members about a rotational axis, the coupling comprising: a casing of a hollow construction that is rotatable within the housing about the rotational axis and connected to one of the rotary members; a hydraulic pump located within the casing along the rotational axis and including a pumping component rotatively connected to the other rotary member to provide a pumping action upon relative rotation between the two rotary members; an inlet port through which hydraulic fluid is pumped into the casing by the hydraulic pump; the casing having a chamber and a transfer port through which the pumped hydraulic fluid is fed from the hydraulic pump to the chamber; the casing also including an outlet port through which pumped hydraulic fluid flows from the chamber; a control valve including a valve element movable between an open position spaced from the outlet port and a closed position that closes the outlet port when the pumped fluid reaches a predetermined pressure to rotatively couple the pair of rotary members to each other upon differential rotation of the rotary members; and an adjuster for adjusting the resistance of fluid flow to control the coupling of the pair of rotary members to each other.

11. A coupling as in claim 10 wherein the adjuster includes an adjustable valve for adjusting the flow area of the transfer port.

12. A coupling as in claim 10 wherein the adjuster includes an adjustable valve for adjusting the flow area of the outlet port.

13. A coupling as in claim 10 wherein the adjuster includes an adjustable valve for adjusting the flow area of the transfer port and another adjustable valve for adjusting the flow area of the outlet port.

14. A coupling as in claim 10 further including a clutch for coupling the pair of rotary members to each other and including an actuating piston that is received within the chamber of the casing and actuatable to actuate the clutch when pumped hydraulic fluid is fed from the hydraulic pump through the transfer port to the chamber to thereby couple the pair of rotary members to each other.

15. A coupling as in claim 14 wherein the casing includes a wall that separates the pump and the piston chamber, the transfer port extending through the casing wall to permit flow of hydraulic fluid from the pump to the piston chamber, and the outlet port extending through the casing wall to permit flow of the pumped hydraulic fluid from the piston chamber back to the pump in a supercharged manner under the control of the control valve.

16. A coupling as in claim 15 wherein the pump includes an impeller rotatively connected to one of the rotary members and having between five and seven external teeth, the hydraulic pump also including an internal ring gear mounted by the casing for rotation eccentrically with respect to the toothed impeller and including internal teeth of a number one more than the impeller teeth and in a meshing relationship therewith to provide the pumping action upon relative rotation between the casing and the toothed impeller.

17. A coupling as in claim 14 wherein the outlet port extends through the piston, and the control valve being mounted on the piston to control flow of hydraulic fluid from the piston chamber through the outlet port in the piston.

18. A coupling as in claim 17 wherein the pump includes an impeller rotatively connected to one of the rotary members and having between five and seven external teeth, the hydraulic pump also including an internal ring gear mounted by the casing for rotation eccentrically with respect to the toothed impeller and including internal teeth of a number one more than the impeller teeth and in a meshing relationship therewith to provide the pumping action upon relative rotation between the casing and the toothed impeller.

19. A coupling as in claim 10 or 14 further including a planetary gear set that couples the pair of rotary members to each other in cooperation with the hydraulic pump.

20. A coupling for use with a vehicle drivetrain within a housing thereof containing hydraulic fluid to rotatively couple a pair of rotary members about a rotational axis, the coupling comprising: a casing of a hollow construction that is rotatable within the housing about the rotational axis and connected to one of the rotary members; a hydraulic pump located within the casing along the rotational axis and including a pumping component rotatively connected to the other rotary member to provide a pumping action upon relative rotation between the two rotary members; an inlet port through which hydraulic fluid is pumped into the casing by the hydraulic pump; the casing having a chamber and a transfer port through which the pumped hydraulic fluid is fed from the hydraulic pump to the chamber; the casing also including an outlet port through which pumped hydraulic fluid flows from the chamber; a clutch for coupling the pair of rotary members to each other and including an actuating piston that is received within the chamber and actuatable to actuate the clutch when pumped hydraulic fluid is fed from the hydraulic pump through the transfer port to the chamber to thereby couple the two rotary members to each other; a control valve including a valve element movable between an open position spaced from the outlet port and a closed position that closes the outlet port when the pumped fluid reaches a predetermined pressure to rotatively couple the pair of rotary members to each other upon differential rotation of the rotary members; an adjuster for adjusting the resistance of fluid flow to control the coupling of the pair of rotary members to each other; and a planetary gear set that cooperates with the hydraulic pump and the clutch to couple the pair of rotary members to each other.

\* \* \* \* \*